US012799269B2

(12) United States Patent
Lee et al.

(10) Patent No.: US 12,799,269 B2
(45) **Date of Patent: *Nov. 17, 2026**

(54) BRANCHED POLY(LACTIC ACID-3-HYDROXYPROPIONIC ACID)COPOLYMER AND METHOD FOR PREPARATION THEREOF

(71) Applicant: LG CHEM, LTD., Seoul (KR)

(72) Inventors: Yeonju Lee, Daejeon (KR); Jung Yun Choi, Daejeon (KR); Donggyun Kang, Daejeon (KR); Chul Woong Kim, Daejeon (KR); Suhyun Cho, Daejeon (KR); Harim Jeon, Daejeon (KR)

(73) Assignee: LG Chem, Ltd., Seoul (KR)

(*) Notice: Subject to any disclaimer, the term of this patent is extended or adjusted under 35 U.S.C. 154(b) by 455 days.

This patent is subject to a terminal disclaimer.

(21) Appl. No.: 18/288,752

(22) PCT Filed: May 6, 2022

(86) PCT No.: PCT/KR2022/006489

§ 371 (c)(1),
(2) Date: Oct. 27, 2023

(87) PCT Pub. No.: WO2022/235113

PCT Pub. Date: Nov. 10, 2022

(65) Prior Publication Data

US 2024/0228694 A1 Jul. 11, 2024

(30) Foreign Application Priority Data

May 6, 2021 (KR) ........................ 10-2021-0058539
May 4, 2022 (KR) ........................ 10-2022-0055700

(51) Int. Cl.
*C08G 63/06* (2006.01)
*C08G 63/82* (2006.01)

(52) U.S. Cl.
CPC ........... *C08G 63/06* (2013.01); *C08G 63/823* (2013.01)

(58) Field of Classification Search
CPC ...................................................... C08G 63/06
See application file for complete search history.

(56) References Cited

U.S. PATENT DOCUMENTS

| | | | |
|---|---|---|---|
| 6,114,458 | A * | 9/2000 | Hawker et al. |
| 2003/0144551 | A1 | 7/2003 | Zhong et al. |
| 2006/0006368 | A1 | 1/2006 | Torii |
| 2007/0003625 | A1 | 1/2007 | Seo et al. |
| 2015/0045518 | A1 | 2/2015 | Fujita et al. |
| 2016/0280849 | A1 | 9/2016 | Kamada et al. |
| 2018/0155490 | A1 | 6/2018 | Sookraj |
| 2018/0334535 | A1 | 11/2018 | Slawinski et al. |
| 2021/0309800 | A1 | 10/2021 | Choi et al. |
| 2022/0267815 | A1 | 8/2022 | Choi et al. |
| 2022/0282030 | A1 | 9/2022 | Choi et al. |

FOREIGN PATENT DOCUMENTS

| | | |
|---|---|---|
| CN | 104114600 A | 10/2014 |
| CN | 110352208 A | 10/2019 |

(Continued)

OTHER PUBLICATIONS

Tripathi et al., (2013), "Biosynthesis and Characterization of Diblock Copolymer of P(3-Hydroxypropionate)-block-P(4-hydroxybutyrate) from Recombinant *Escherichia coli*," Biomacromolecules, vol. 14, No. 3, pp. 862-870.

(Continued)

*Primary Examiner* — Randy P Gulakowski

(74) *Attorney, Agent, or Firm* — Bryan Cave Leighton Paisner LLP

(57) ABSTRACT

Provided is a novel branched poly(lactic acid-3-hydroxypropionic acid) copolymer of Chemical Formula 1:

[Chemical Formula 1]

$$R-[A-B]_k$$

wherein: R is a trivalent or higher functional group derived from a polyfunctional monomer, A is a direct bond, or a linking group derived from ether, sulfide, ester, thioester, ketone, sulfoxide, sulfone, sulfonate ester, amine, amide, imine, imide, or urethane, and B is a substituent of Chemical Formula 1-1 or Chemical Formula 1-2,

[Chemical Formula 1-1]

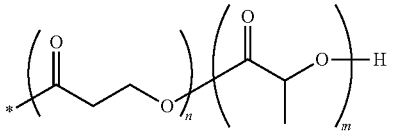

[Chemical Formula 1-2]

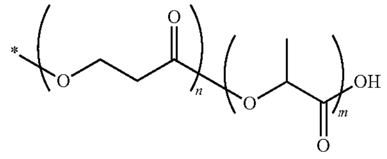

where * is a moiety connected to A, k is an integer of 3 or more, n is an integer of 1 to 700, and m is an integer of 10 to 5,000. The copolymer can realize an excellent production yield while maintaining the intrinsic physical properties of poly(3-hydroxypropionic acid). Also provided is a method for preparing the copolymer.

18 Claims, No Drawings

(56) References Cited

FOREIGN PATENT DOCUMENTS

| | | | | | |
|---|---|---|---|---|---|
| EP | 3795606 | A1 | | 3/2021 | |
| JP | 2006-526053 | A | | 11/2006 | |
| JP | 2013-057039 | A | | 3/2013 | |
| JP | 2015120874 | A | | 7/2015 | |
| JP | 6191456 | B2 | | 9/2017 | |
| JP | 6874156 | B2 | | 5/2021 | |
| KR | 10-2004-0057793 | A | | 7/2004 | |
| KR | 10-2020-0115165 | A | | 10/2020 | |
| KR | 10-2020-0126790 | A | | 11/2020 | |
| KR | 10-2021-0031319 | A | | 3/2021 | |
| KR | 10-2021-0032296 | A | | 3/2021 | |
| KR | 10-2021-0038251 | A | | 4/2021 | |
| WO | WO-2015076397 | A1 | * | 5/2015 | ............. C08G 63/08 |

OTHER PUBLICATIONS

Ramier et al., (2012), "Microwave-assisted synthesis and characterization of biodegradable block copolyesters based on poly(3-hydroxyalkanoate)s and poly(D,L-lactide)", Journal of Polymer Science Part A: Polymer Chemistry, vol. 50, No. 7, pp. 1445-1455.

"Handbook of Hazardous Substances in Industrial Production, vol. 2, Orangic Compounds", Chemical Industry Press, Sep. 1998, pp. 232-233.

"Polymer Materials", Henan University Press, Sep. 2018, pg. 299.

* cited by examiner

BRANCHED POLY(LACTIC ACID-3-HYDROXYPROPIONIC ACID)COPOLYMER AND METHOD FOR PREPARATION THEREOF

CROSS-REFERENCE TO RELATED APPLICATION(S)

This application is a National Stage Application of International Application No. PCT/KR2022/006489 filed on May 6, 2022, which claims the benefit of Korean Patent Application No. 10-2021-0058539 filed on May 6, 2021 and Korean Patent Application No. 10-2022-0055700 filed on May 6, 2022 in the Korean Intellectual Property Office, the entire contents of which are incorporated herein by reference.

TECHNICAL FIELD

The present disclosure relates to a novel branched poly (lactic acid-3-hydroxypropionic acid)copolymer and method for preparation thereof.

BACKGROUND

Polylactic acid (PLA) is a plant-derived resin obtained from plants such as corn, and is attracting attention as an environmentally friendly material having biodegradability and having excellent tensile strength and elastic modulus.

Unlike petroleum-based resins such as polystyrene resin, polyvinyl chloride resin, and polyethylene, which are conventionally used, polylactic acid has effects such as preventing depletion of petroleum resources and suppressing carbon dioxide emissions, and therefore can reduce environmental pollution, which is a drawback of petroleum-based plastic products. Therefore, as the problem of environmental pollution caused by waste plastics has emerged as social issues, attempts are being made to expand the scope of application to products where general plastics (petroleum-based resins) have been used, such as food packaging materials, containers, and electronic product cases.

However, polylactic acid is inferior in impact resistance and heat resistance as compared to conventional petroleum-based resins, and thus, its application range is limited. In addition, polylactic acid is poor in elongation at break characteristics and exhibits brittleness, which limits its use as a general-purpose resin.

In order to improve the shortcomings mentioned above, studies on copolymers containing other repeating units in polylactic acid are underway, and especially, in order to improve elongation at break, 3-hydroxypropionic acid (3HP) is attracting attention as a comonomer. In particular, lactic acid-3HP block copolymer is attracting attention, wherein the copolymer has the effect of improving the elongation at break characteristics while maintaining the intrinsic characteristics of polylactic acid.

However, from the viewpoint of commercialization, production of a high-molecular weight lactic acid-3HP block copolymer is required, but in the process of performing a polycondensation of 3-hydroxypropionic acid, a low-molecular weight cyclic structure is generated, whereby not only poly(3-hydroxypropionate) (P3HP) having a high molecular weight cannot be produced but also the production yield of poly(3-hydroxypropionate) is reduced.

In order to improve the structural limitations, research is underway to produce copolymers with other monomers, but there is a problem that it is difficult to produce a resin that can realize an excellent production yield while maintaining the intrinsic physical properties of poly(3-hydroxypropionic acid).

BRIEF DESCRIPTION

Technical Problem

It is an object of the present disclosure to provide a novel branched poly(lactic acid-3-hydroxypropionic acid)copolymer exhibiting excellent physical properties and a method for preparation thereof.

Technical Solution

First, in the present disclosure, the term "substituted or unsubstituted" means being unsubstituted or substituted with one or more substituents selected from the group consisting of deuterium, a halogen group, a nitrile group, a nitro group, a hydroxy group, a carbonyl group, an ester group, an imide group, an amino group, a phosphine oxide group, an alkoxy group, an aryloxy group, an alkylthioxy group, an arylthioxy group, an alkylsulfoxy group, an arylsulfoxy group, a silyl group, a boron group, an alkyl group, a cycloalkyl group, an alkenyl group, an aryl group, an aralkyl group, an aralkenyl group, an alkylaryl group, an alkylamine group, an aralkylamine group, a heteroarylamine group, an arylamine group, an arylphosphine group, or a heterocyclic group containing at least one of N, O and S atoms, or being unsubstituted or substituted with a substituent to which two or more substituents of the above-exemplified substituents are linked. For example, "a substituent in which two or more substituents are linked" can be a biphenyl group. Namely, a biphenyl group can be an aryl group, or it can be interpreted as a substituent in which two phenyl groups are connected.

In the present disclosure, the carbon number of a carbonyl group is not particularly limited, but is preferably 1 to 40. A specific example thereof can be a moiety having one of the following structural formulas, but is not limited thereto:

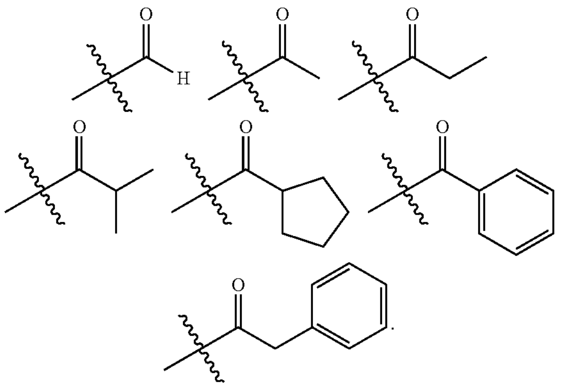

In the present disclosure, an ester group can have a structure in which oxygen of the ester group can be substituted by a straight-chain, branched-chain, or cyclic alkyl group having 1 to 25 carbon atoms, or an aryl group having 6 to 25 carbon atoms. A specific example thereof can be a moiety having one of the following structural formulas, but is not limited thereto:

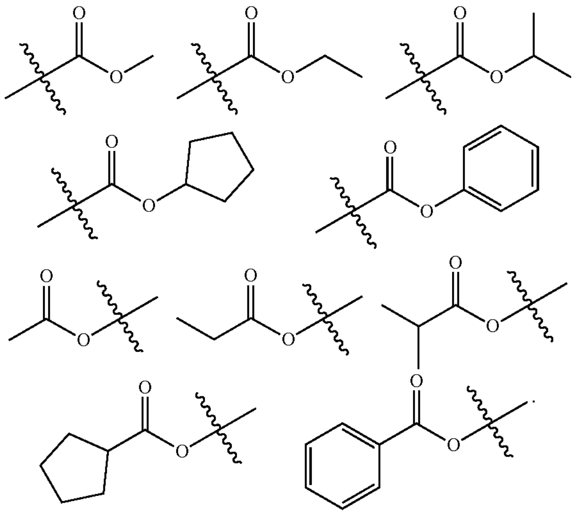

In the present disclosure, the carbon number of an imide group is not particularly limited, but is preferably 1 to 25. A specific example thereof can be a moiety having one of the following structural formulas, but is not limited thereto:

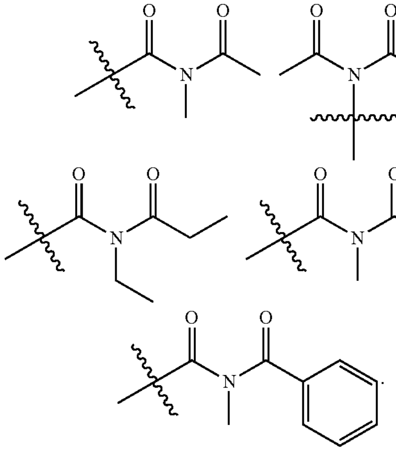

In the present disclosure, a silyl group specifically includes a trimethylsilyl group, a triethylsilyl group, a t-butyldimethylsilyl group, a vinyldimethylsilyl group, a propyldimethylsilyl group, a triphenylsilyl group, a diphenylsilyl group, a phenylsilyl group and the like, but is not limited thereto.

In the present disclosure, a boron group specifically includes a trimethylboron group, a triethylboron group, a t-butyldimethylboron group, a triphenylboron group, and a phenylboron group, but is not limited thereto.

In the present disclosure, examples of a halogen group include fluorine, chlorine, bromine, or iodine.

In the present disclosure, the alkyl group can be straight-chain or branched-chain, and the carbon number thereof is not particularly limited, but is preferably 1 to 40. According to one embodiment, the carbon number of the alkyl group is 1 to 20. According to another embodiment, the carbon number of the alkyl group is 1 to 10. According to yet another embodiment, the carbon number of the alkyl group is 1 to 6. Specific examples of the alkyl group include methyl, ethyl, propyl, n-propyl, isopropyl, butyl, n-butyl, isobutyl, tert-butyl, sec-butyl, 1-methyl-butyl, 1-ethyl-butyl, pentyl, n-pentyl, isopentyl, neopentyl, tert-pentyl, hexyl, n-hexyl, 1-methylpentyl, 2-methylpentyl, 4-methyl-2-pentyl, 3,3-dimethylbutyl, 2-ethylbutyl, heptyl, n-heptyl, 1-methylhexyl, cyclopentylmethyl, cyclohexylmethyl, octyl, n-octyl, tert-octyl, 1-methylheptyl, 2-ethylhexyl, 2-propylpentyl, n-nonyl, 2,2-dimethylheptyl, 1-ethyl-propyl, 1,1-dimethyl-propyl, isohexyl, 2-methylpentyl, 4-methylhexyl, 5-methylhexyl, and the like, but are not limited thereto.

In the present disclosure, the alkenyl group can be a straight chain or a branched chain, and the carbon number thereof is not particularly limited, but is preferably 2 to 40. According to one embodiment, the carbon number of the alkenyl group is 2 to 20. According to another embodiment, the carbon number of the alkenyl group is 2 to 10. According to still another embodiment, the carbon number of the alkenyl group is 2 to 6. Specific examples thereof include vinyl, 1-propenyl, isopropenyl, 1-butenyl, 2-butenyl, 3-butenyl, 1-pentenyl, 2-pentenyl, 3-pentenyl, 3-methyl-1-butenyl, 1,3-butadienyl, allyl, 1-phenylvinyl-1-yl, 2-phenylvinyl-1-yl, 2,2-diphenylvinyl-1-yl, 2-phenyl-2-(naphthyl-1-yl)vinyl-1-yl, 2,2-bis(diphenyl-1-yl)vinyl-1-yl, a stilbenyl group, a styrenyl group, and the like, but are not limited thereto.

In the present disclosure, a cycloalkyl group is not particularly limited, but the carbon number thereof is preferably 3 to 60. According to one embodiment, the carbon number of the cycloalkyl group is 3 to 30. According to another embodiment, the carbon number of the cycloalkyl group is 3 to 20. According to still another embodiment, the carbon number of the cycloalkyl group is 3 to 6. Specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, cyclooctyl, and the like, but are not limited thereto.

In the present disclosure, an aryl group is not particularly limited, but the carbon number thereof is preferably 6 to 60, and it can be a monocyclic aryl group or a polycyclic aryl group. According to one embodiment, the carbon number of the aryl group is 6 to 30. According to one embodiment, the carbon number of the aryl group is 6 to 20. The aryl group can be a phenyl group, a biphenyl group, a terphenyl group or the like as the monocyclic aryl group, but is not limited thereto. The polycyclic aryl group includes a naphthyl group, an anthracenyl group, a phenanthrenyl group, a pyrenyl group, a perylenyl group, a chrysenyl group, a fluorenyl group, and the like, but is not limited thereto.

In the present disclosure, the fluorenyl group can be substituted, and two substituents can be linked with each other to form a spiro structure. In the case where the fluorenyl group is substituted,

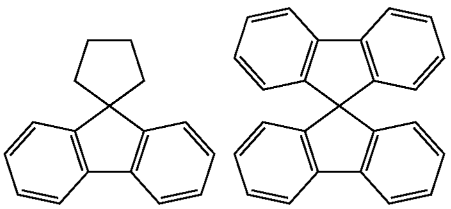

-continued

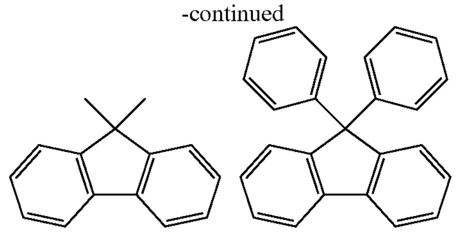

and the like can be formed. However, the structure is not limited thereto.

In the present disclosure, a heterocyclic group is a heterocyclic group containing at least one of O, N, Si and S as a heteroatom, and the carbon number thereof is not particularly limited, but is preferably 2 to 60. Examples of the heterocyclic group include a thiophene group, a furan group, a pyrrole group, an imidazole group, a thiazole group, an oxazol group, an oxadiazol group, a triazol group, a pyridyl group, a bipyridyl group, a pyrimidyl group, a triazine group, an acridyl group, a pyridazine group, a pyrazinyl group, a quinolinyl group, a quinazoline group, a quinoxalinyl group, a phthalazinyl group, a pyridopyrimidinyl group, a pyridopyrazinyl group, a pyrazinopyrazinyl group, an isoquinoline group, an indole group, a carbazole group, a benzoxazole group, a benzoimidazole group, a benzothiazol group, a benzocarbazole group, a benzothiophene group, a dibenzothiophene group, a benzofuranyl group, a phenanthroline group, an isoxazolyl group, a thiadiazolyl group, a phenothiazinyl group, a dibenzofuranyl group, and the like, but are not limited thereto.

In the present disclosure, the aryl group in the aralkyl group, the aralkenyl group, the alkylaryl group and the arylamine group is the same as the aforementioned examples of the aryl group. In the present disclosure, the alkyl group in the aralkyl group, the alkylaryl group and the alkylamine group is the same as the aforementioned examples of the alkyl group. In the present disclosure, the heteroaryl in the heteroarylamine can be applied to the aforementioned description of the heterocyclic group. In the present disclosure, the alkenyl group in the aralkenyl group is the same as the aforementioned examples of the alkenyl group. In the present disclosure, the aforementioned description of the aryl group can be applied except that the arylene is a divalent group. In the present disclosure, the aforementioned description of the heterocyclic group can be applied except that the heteroarylene is a divalent group. In the present disclosure, the aforementioned description of the aryl group or cycloalkyl group can be applied except that the hydrocarbon ring is not a monovalent group but formed by combining two substituent groups. In the present disclosure, the aforementioned description of the heterocyclic group can be applied, except that the heterocycle is not a monovalent group but formed by combining two substituent groups.

In order to achieve the above object, according to the present disclosure, provided is a branched poly(lactic acid-3-hydroxypropionic acid)copolymer of the following Chemical Formula 1:

[Chemical Formula 1]

$$R—[A—B]_k$$

wherein, in Chemical Formula 1:

R is a trivalent or higher functional group derived from a polyfunctional monomer;

A is a direct bond, or a linking group derived from an ether, sulfide, ester, thioester, ketone, sulfoxide, sulfone, sulfonate ester, amine, amide, imine, imide, or urethane; and B is a substituent of the following Chemical Formula 1-1 or Chemical Formula 1-2:

[Chemical Formula 1-1]

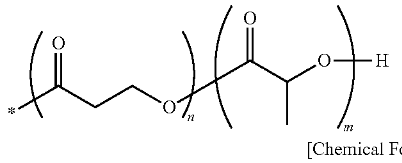

[Chemical Formula 1-2]

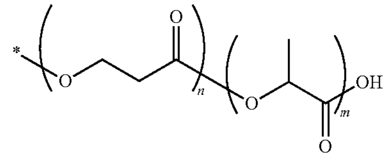

wherein: * is a moiety connected to A;

k is an integer of 3 or more;

n is an integer of 1 to 700; and m is an integer of 10 to 5,000.

Also, according to the present disclosure, provided is a method for preparing a branched poly(lactic acid-3-hydroxypropionic acid)copolymer, the method comprising: a first step of preparing a branched poly(3-hydroxypropionic acid)polymer, and a second step of subjecting the branched poly(3-hydroxypropionic acid)polymer and lactide to a ring-opening polymerization to prepare a branched poly(lactic acid-3-hydroxypropionic acid)copolymer of Chemical Formula 1 below:

Usually, in order to prepare the poly(lactic acid-3-hydroxypropionic acid)copolymer, 3HP (polyhydroxypropionic acid) was synthesized, and lactide was added thereto to perform a ring-opening polymerization, or PLA (polylactic acid) and P3HP were each separately polymerized, and then annealed in a multi-step reaction, which caused a problem that the process efficiency decreased.

In particular, during such multi-step reaction processes, low molecular weight by-products, especially cyclic oligomers, are generated, and cyclic oligomers do not proceed a condensation polycondensation, whereby there was a problem that the production yield of the copolymer is lowered, and an additional process requiring separation of by-products is necessary.

Therefore, the present inventors have found that when a novel branched poly(3-hydroxypropionic acid)polymer is formed using a unique multifunctional monomer, and copolymerized with PLA through a ring-opening reaction, it has excellent physical properties and is also excellent in the synthesis yield, and completed the present disclosure.

In particular, the inventors have found that due to the introduction of the novel branched structure, the viscosity drops sharply at a high shear rate, which improves the processability of the resin, and also the crystallinity can be lowered by the structure to compensate for the brittleness, and completed the present disclosure.

DETAILED DESCRIPTION

Now, the novel polymer structure of the present disclosure and a method for preparing the same will be described in detail.

Branched Poly(Lactic Acid-3-Hydroxypropionic Acid)Copolymer

In one embodiment of the present disclosure, the branched poly(lactic acid-3-hydroxypropionic acid)copolymer has the following Chemical Formula 1:

[Chemical Formula 1]

$$R—[A—B]_k$$

wherein, in Chemical Formula 1:

R is a trivalent or higher functional group derived from a polyfunctional monomer;

A is a direct bond, or a linking group derived from an ether, sulfide, ester, thioester, ketone, sulfoxide, sulfone, sulfonate ester, amine, amide, imine, imide, or urethane; and B is a substituent of the following Chemical Formula 1-1 or Chemical Formula 1-2:

[Chemical Formula 1-1]

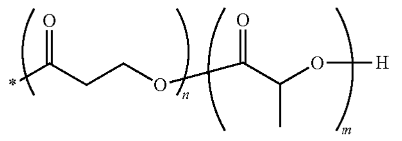

[Chemical Formula 1-2]

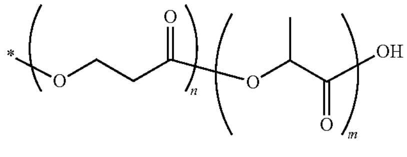

wherein: * is a moiety connected to A;

k is an integer of 3 or more;

n is an integer of 1 to 700; and m is an integer of 10 to 5,000.

As used herein, the term "branched" means a polymer of monomers each having three or more functional groups, and the R moiety in Chemical Formula 1 is defined as a branched structure.

Preferably, k is an integer of 3 to 10 or 3 to 8.

Preferably, the R is a trivalent or higher linking group derived from a substituted or unsubstituted $C_{1-60}$ alkyl, a substituted or unsubstituted $C_{3-60}$ cycloalkyl, a substituted or unsubstituted $C_{6-60}$ aryl or a substituted or unsubstituted $C_{2-60}$ heteroaryl containing at least one of N, O and S, wherein at least one of the carbon atoms of the alkyl, cycloalkyl, aryl and heteroaryl is unsubstituted or substituted with at least one heteroatom selected from the group consisting of N, O and S, or carbonyl.

The copolymer is prepared by subjecting 3-hydroxypropionic acid and a polyfunctional monomer to a condensation polymerization, or is prepared by subjecting β-propiolactone and a polyfunctional monomer to a ring-opening polymerization to prepare branched poly(3-hydroxypropionic acid) polymer, and then performing a ring-opening polymerization of the resulting polymer with lactide, thereby forming a poly(lactic acid-3-hydroxypropionic acid)copolymer.

The polyfunctional monomer can include, preferably, glycerol, pentaerythritol, 3-arm-poly(ethyleneglycol)$_{n=2\sim15}$, 4-arm-poly(ethyleneglycol)$_{n=2\text{-}10}$, di(trimethylolpropane), tripentaerythritol, xylitol, sorbitol, inositol, cholic acid, β-cyclodextrin, tetrahydroxyperylene, 2,2'-bis(hydroxymethyl)butyric acid (BHB), pyridinetetraamine (PTA), diethyltriaminepentaacetic acid, melamine, propane-1,2,3-triamine, tetraacetylene pentaamine, benzene-1,3,5-triamine, toluene-2,4,6-triisocyanate, 2-isocyanatoethyl-2,6-diisocyanatocaproate, triphenyl ethane-4,4,4-triisocyanate, trimethylolpropane, triethanolamine, triglycidyl, s-triazine-1,3,5-triethanol ether, and the like.

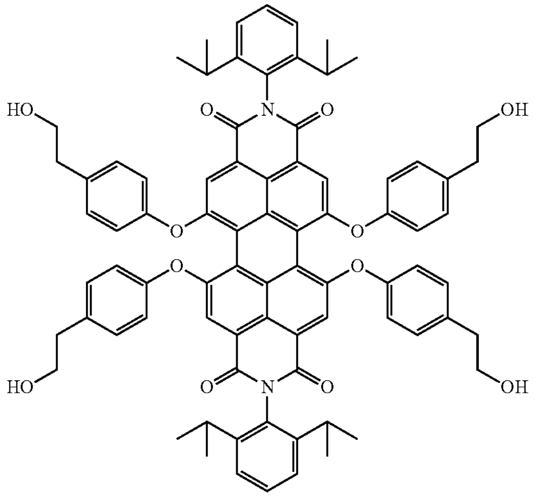

Tetrahydroxyperylene (4-arm)

The copolymer can have a weight average molecular weight (Mw) of 30,000 to 500,000, preferably, 32,000 to 300,000, 35,000 to 280,000, or 38,000 to 270,000, 32,000 or more, 35,000 or more, or 38,000 or more, or 300,000 or less, 280,000 or less, or 270,000 or less. When it has a corresponding weight average molecular weight value, it is suitable for achieving appropriate processability.

The copolymer can have a number average molecular weight (Mn) of 10,000 to 150,000, preferably, 15,000 to 120,000, 20,000 to 100,000, or 23,000 to 80,000, 15,000 or more, 20,000 or more, or 23,000 or more, 120,000 or less, 100,000 or less, or 8,000 or less.

The copolymer can have a polydispersity index (PDI) of 1.5 to 5.0, preferably, it is 1.6 to 4.5 or 1.61 to 4.0, 1.6 or more, or 1.61 or more, 4.5 or less, or 4.0 or less.

Method for Preparing Branched Poly(Lactic Acid-3-Hydroxypropionic Acid)Copolymer According to another embodiment of the disclosure, a method for preparing the branched poly(lactic acid-3-hydroxypropionic acid)copolymer is provided.

Specifically, the method comprises a first step of preparing a branched poly(3-hydroxypropionic acid)polymer, and a second step of subjecting the branched poly(3-hydroxypropionic acid)polymer and lactide to a ring-opening polymerization to prepare a branched poly(lactic acid-3-hydroxypropionic acid)copolymer of the following Chemical Formula 1:

[Chemical Formula 1]

$$R—[A—B]_k$$

wherein, in Chemical Formula 1,

R is a trivalent or higher functional group derived from a polyfunctional monomer, A is a direct bond, or a linking group derived from ether, sulfide, ester, thioester, ketone, sulfoxide, sulfone, sulfonate ester, amine, amide, imine, imide, or urethane, B is a substituent of the following Chemical Formula 1-1 or Chemical Formula 1-2,

[Chemical Formula 1-1]

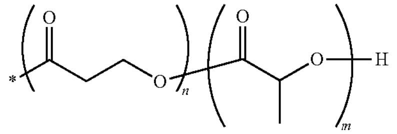

[Chemical Formula 1-2]

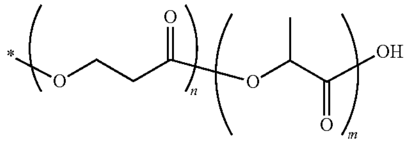

* is a moiety connected to A, k is an integer of 3 or more, n is an integer of 1 to 700, and m is an integer of 10 to 5,000.

Here, the structure of Chemical Formula 1 is similarly applied to the branched poly(3-hydroxypropionic acid)polymer described above, and the specific types, contents, etc. of the monomers forming the polymer are the same as those described above, and thus, detailed description thereof will be omitted here.

Each step will be described in detail below.

(First Step)

In the first step, the branched poly(3-hydroxypropionic acid) polymer is prepared by subjecting 3-hydroxypropionic acid and a polyfunctional monomer to a condensation polymerization, or is prepared by subjecting β-propiolactone and a polyfunctional monomer to a ring-opening polymerization.

Wherein, the polyfunctional monomer can include glycerol, pentaerythritol, 3-arm-poly(ethyleneglycol)$_{n=2\sim15}$, 4-arm-poly(ethyleneglycol)$_{n=2\sim10}$, di(trimethylolpropane), tripentaerythritol, xylitol, sorbitol, inositol, cholic acid, β-cyclodextrin, tetrahydroxyperylene, 2,2'-bis(hydroxymethyl)butyric acid (BHB), pyridinetetraamine (PTA), diethyltriaminepentaacetic acid, melamine, propane-1,2,3-triamine, tetraacetylene pentaamine, benzene-1,3,5-triamine, toluene-2,4,6-triisocyanate, 2-isocyanatoethyl-2,6-diisocyanatocaproate, triphenyl ethane-4,4,4-triisocyanate, trimethylolpropane, triethanolamine, triglycidyl, s-triazine-1,3,5-triethanol ether, and the like.

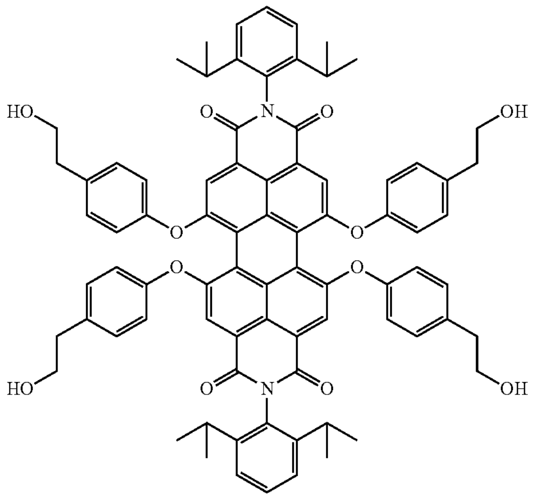

Tetrahydroxyperylene (4-arm)

The branched poly(3-hydroxypropionic acid)polymer polymerized in the above step can have the structure of Chemical Formula 2:

[Chemical Formula 2]

$$R—[A—(B')n]_k$$

wherein, in Chemical Formula 2:

R is a trivalent or higher functional group derived from a polyfunctional monomer;

A is a direct bond, or a linking group derived from an ether, sulfide, ester, thioester, ketone, sulfoxide, sulfone, sulfonate ester, amine, amide, imine, imide, or urethane; and B' is a substituent of the following Chemical Formula 1'-1 or Chemical Formula 1'-2:

[Chemical Formula 1'-1]

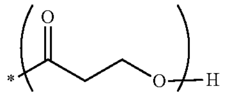

[Chemical Formula 1'-2]

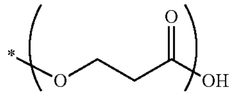

wherein: * is a moiety connected to A;

k is an integer of 3 or more; and n is an integer of 1 to 700.

In the first step, when the branched poly(3-hydroxypropionic acid)polymer is prepared by subjecting 3-hydroxypropionic acid with a polyfunctional monomer to a condensation polymerization, the polyfunctional monomer can be included and polymerized in an amount of 0.1 mol % to 20 mol % with respect to the content of 3-hydroxypropionic acid. When polymerized within the above content range, it is suitable for forming a desired branched structure with an appropriate crosslinked structure in an excellent yield. When the content of the polyfunctional monomer is less than 0.1 mol %, it is difficult to form a desired cross-linked structure, and when it exceeds 20 mol %, crosslinking is made in the form of a relatively low molecular weight oligomer, so it is difficult to obtain a high molecular weight polymer, which causes a problem that the reaction time is long and the process efficiency is lowered. Preferably, the content of the polyfunctional monomer can be 0.1 mol % to 15 mol %, 0.5 mol % to 10 mol %, or 1 mol % to 8 mol %, or 0.1 mol % or more, 0.5 mol % or more, or 1.0 mol % or more, or 15 mol % or less, 10 mol % or less, or 8 mol % or less. In this case, the polymer can be formed without the above-mentioned problems.

Further, in the first step, when the branched poly(3-hydroxypropionic acid)polymer is prepared by subjecting β-propiolactone and a polyfunctional monomer to a ring-opening polymerization, the polyfunctional monomer can be included and polymerized in an amount of 0.1 mol % to 20 mol % with respect to the content of the 0-propiolactone. When polymerized within the above content range, it is suitable for forming a desired branched structure with an appropriate crosslinked structure in an excellent yield. When the content of the polyfunctional monomer is less than 0.1 mol %, it is difficult to form a desired crosslinked structure, and when the content exceeds 20 mol %, crosslinking is made in the form of a relatively low molecular weight oligomer, and thus, it is difficult to obtain a high molecular weight polymer, which causes a problem that the reaction time is long and the process efficiency is lowered. Preferably, the polyfunctional monomer can be used in the amount of 0.1 mol % to 15 mol %, 0.5 mol % to 10 mol %, or 1 mol % to 8 mol %, or 0.1 mol % or more, 0.5 mol % or more, or 1.0 mol % or more, or 15 mol % or less, 10 mol % or less, or 8 mol % or less. In this case, the polymer can be formed without the above-mentioned problems.

The branched poly(3-hydroxypropionic acid)polymer can have a weight average molecular weight (Mw) of 1,000 to 100,000, preferably 1,500 to 80,000, 1,900 to 50,000, 2,000 to 40,000, or 5,000 to 30,000, 1,500 or more, 1,900 or more, or 2,000 or more, 80,000 or less, 50,000 or less, 40,000 or less, or 30,000 or less.

The first step can be performed in the presence of a sulfonic acid-based catalyst and a tin-based catalyst. The catalyst has the effect of promoting polymerization and at the same time suppressing the formation of cyclic oligomers during the polymerization process.

Preferably, the sulfonic acid-based catalyst is p-toluenesulfonic acid, m-xylene-4-sulfonic acid, 2-mesitylenesulfonic acid, or p-xylene-2-sulfonic acid. Further, preferably, the tin-based catalyst is $SnCl_2$ or $Sn(oct)_2$.

Preferably, the sulfonic acid-based catalyst is used in an amount of 0.001 mol % to 1 mol % relative to 3-hydroxypropionic acid or β-propiolactone, respectively. In the above range, it is possible to promote polymerization and at the same time suppress the formation of cyclic oligomers. Preferably, the content of the sulfonic acid-based catalyst can be 0.01 mol % to 0.8 mol %, or 0.02 mol % to 0.5 mol %, 0.01 mol % or more, or 0.02 mol % or more, 0.8 mol % or less, or 0.5 mol % or less.

Preferably, the tin-based catalyst is used in an amount of 0.00025 mol % to 1 mol % relative to 3-hydroxypropionic acid or β-propiolactone, respectively. In the above range, it is possible to promote polymerization and at the same time suppress the formation of cyclic oligomers. Preferably, the amount of the tin-based catalyst can be 0.001 mol % to 0.8 mol %, 0.005 to 0.5 mol %, or 0.01 to 0.3 mol %, 0.001 mol % or more, 0.005 mol % or more, or 0.01 mol % or more, or 0.8 mol % or less, 0.5 mol % or less, or 0.3 mol % or less.

The polymerization reaction can be performed at 80 °C to 100 °C and 8 mbar to 12 mbar for 110 to 130 minutes, and then the reaction can be performed under vacuum conditions of $10^{-2}$ torr for 4 hours to 26 hours. When melt polymerization is performed under the above conditions, it is possible to suppress the generation of products from side reactions.

More specifically, the oligomerization reaction is performed at 80 °C to 100 °C and 8 mbar to 12 mbar for 110 minutes to 130 minutes, and then the reaction can proceed under a vacuum condition of $10^{-2}$ torr for 4 hours to 26 hours to form the polymer of Chemical Formula 1.

The subsequent polymerization can be performed at the same temperature as the oligomerization reaction, or it can be performed by raising the temperature to 100 °C to 120 °C Preferably, the reaction is performed at about 90±3 °C and about 10±1 mbar for about 120±5 minutes, and then the temperature is raised to the same temperature or about 110±3 °C and the reaction is performed under vacuum conditions of about $10^{-2}$ torr. For reference, the reaction subsequent to oligomerization can be appropriately adjusted according to the content range of the polyfunctional monomer used, and when an excessive amount of polyfunctional monomer is used, the reaction time becomes longer and chain transfer can occur as a side reaction, resulting in gelation. The reaction can be performed under appropriate adjustment within about 24 hours.

Meanwhile, if necessary, the 3-hydroxypropionic acid (or β-propiolactone) and the polyfunctional monomer can be independently pretreated at 30 °C to 100 °C and 30 mbar to 150 mbar prior to polymerization. Through the pretreatment step, it is possible to remove the water present in 3-hydroxypropionic acid and the polyfunctional monomer.

(Second Step)

Next, the method comprises a second step of subjecting the branched poly(3-hydroxypropionic acid)polymer and lactide to a ring-opening polymerization to prepare a branched poly(lactic acid-3-hydroxypropionic acid)copolymer of the above-mentioned Chemical Formula 1.

The term 'lactide' as used herein refers to L-lactide, D-lactide, meso-lactide consisting of one L-form and one D-form, or a mixture of L-lactide and D-lactide in a weight ratio of 50:50 is referred to as D,L-lactide or rac-lactide.

In the second step, the branched poly(3-hydroxypropionic acid)polymer can be included in an amount of 0.1 to 40 parts by weight, preferably, 0.5 to 20 parts by weight or 1 to 15 parts by weight, 0.5 parts by weight or more, or 1 part by weight or more, 20 parts by weight or less, or 10 parts by weight or less with respect to 100 parts by weight of lactide. It is preferable to use within the above content range to form a polymer having a desired novel branched structure.

In the second step, the polymerization can be performed in the presence of a catalyst of Chemical Formula 3:

[Chemical Formula 3]

$$MA^1_pA^2_{2-p}$$

wherein, in Chemical Formula 3:

M is Al, Mg, Zn, Ca, Sn, Fe, Y, Sm, Lu, Ti or Zr;

p is an integer of 0 to 2; and $A^1$ and $A^2$ are each independently an alkoxy or a carboxyl group.

Preferably, in the second step, the polymerization can be performed in the presence of a tin(II) 2-ethylhexanoate ($Sn(Oct)_2$) catalyst.

In the second step, the polymerization reaction can be performed at 150 °C to 250 °C under nitrogen conditions for 60 minutes to 120 minutes, and preferably, the reaction can be performed at 170 °C to 200 °C under nitrogen conditions for 80 to 100 minutes. When the polymerization is performed under the above conditions, it is possible to suppress the generation of products from side reactions, which is preferable.

Meanwhile, if necessary, the branched poly(3-hydroxypropionic acid)polymer and lactide prepared in step 1 can be each independently pretreated at room temperature for about 5 to 24 hours prior to polymerization. Through the pretreatment step, water present in the branched poly(3-hydroxypropionic acid)polymer and lactide can be removed.

(Article)

In addition, according to another embodiment of the present disclosure, an article comprising the novel branched poly(lactic acid-3-hydroxypropionic acid)copolymer is provided.

The article can include a packaging material, a film, a nonwoven fabric, and the like, and can be applied to the article, thereby having excellent elongation properties and at the same time compensating for brittleness.

Advantageous Effects

As described above, the branched poly(lactic acid-3-hydroxypropionic acid)copolymer and the preparation method thereof according to the present disclosure can effectively prepare a polymer that achieves excellent production yield while maintaining the intrinsic physical properties of poly(3-hydroxypropionic acid).

EXAMPLES

Hereinafter, embodiments of the present disclosure will be described in more detail with reference to examples. However, the following examples are merely illustrative of embodiments of the present invention, and the scope of the present disclosure is not limited thereby.

Examples and Comparative Examples

Example 1

(Step 1) 3-hydroxypropionic acid (3HP) and glycerol dissolved in water were added to RBF, and water was dried at 90 °C and 100 torr for 2 hours.

70 g of dried 3-hydroxypropionic acid (3HP) and 7.156 g of glycerol (10 mol % relative to 3HP) were added to a reactor, and an oligomerization reaction was performed using 295.6 mg of p-TSA (0.2 mol % relative to 3HP) as a catalyst at 90 °C at 10 mbar for 2 hours. An additional polymerization reaction was performed for 8 hours while adding 157.4 mg of $SnCl_2$ (0.05 mol % relative to 3HP) as a co-catalyst (t=5) under a vacuum degree of 0.1 torr to prepare a branched copolymer (Mw 2,700).

(Step 2) 4 g of the branched P3HP copolymer prepared above and 40 g of lactide were added to a reactor, and water was dried in vacuum at room temperature for about 16 hours. 180 μL of a $Sn(Oct)_2$ solution having a concentration of 0.01M in toluene was injected into the reactor, and the toluene was dried in vacuum for 30 minutes. Next, the reactor was filled with nitrogen, and the reaction was performed for 90 minutes in an oil bath preheated to 180 °C. Thereby, a product containing the novel branched P3HP-co-PLA copolymer was obtained. In order to remove residual lactide in the product, devolatilization was performed at 140 °C for 4 hours to prepare a branched P3HP-co-PLA copolymer.

Example 2

A branched P3HP copolymer (Mw: 2,300) was prepared in the same manner as in Example 1, except that in step 1 of Example 1, glycerol was used in the amount of 5 mol % relative to 3HP.

In addition, a branched P3HP-co-PLA copolymer was prepared in the same manner as in Example 1, except that in step 2 of Example 1, the reaction time was set to 60 minutes.

Example 3

A branched P3HP copolymer (Mw: 16,000) was prepared in the same manner as in Example 1, except that in step 1 of Example 1, glycerol was used in the amount of 1 mol % relative to 3HP.

In addition, a branched P3HP-co-PLA copolymer was prepared in the same manner as in Example 1, except that in step 2 of Example 1, the reaction time was set to 70 minutes,

Example 4

A branched P3HP copolymer (Mw: 39,000) was prepared in the same manner as in Example 1, except that in step 1 of Example 1, glycerol was used in the amount of 0.5 mol % relative to 3HP.

In addition, a branched P3HP-co-PLA copolymer was prepared in the same manner as in Example 1, except that in step 2 of Example 1, the reaction time was set to 90 minutes.

Comparative Example 1

4 g of a linear P3HP copolymer (Mw 9,600) prepared from a single condensation reaction of 3-hydroxypropionic acid (3HP) and 40 g of lactide were added to a reactor, and water was dried in vacuum at room temperature for about 16 hours. 180 μL of a $Sn(Oct)_2$ solution having a concentration of 0.01M in toluene was injected into the reactor, and the toluene was dried in vacuum for 30 minutes. Next, the reactor was filled with nitrogen, and the reaction was performed for 90 minutes in an oil bath preheated to 180 °C. Thereby, a product containing the branched P3HP-co-PLA copolymer was obtained. In order to remove residual lactide in the product, devolatilization was performed at 140 °C for 4 hours to prepare a P3HP-co-PLA copolymer.

Comparative Example 2

A P3HP-co-PLA copolymer was prepared in the same manner as in Comparative Example 1, except that the linear P3HP copolymer (Mw 28,500) prepared from a single condensation reaction of 3-hydroxypropionic acid (3HP) was used in the same amount, and the reaction time was set to 60 minutes.

Experimental Example

The characteristics of the copolymers prepared in the Examples and Comparative Examples were evaluated as follows.

1) Evaluation of GPC (Gel Permeation Chromatography) Molecular Weight

For each step, copolymer prepared in the Examples and Comparative Examples, the molecular weight was evaluated using Water e2695 model device and Agilent Plgel mixed c and b column. The sample was prepared at 4 mg/ml and chloroform was prepared as a solvent, and 20 μL was injected. The weight average molecular weight, number average molecular weight, and polydispersity index were measured by gel permeation chromatography (GPC, Tosoh ECO SEC Elite), and the results are shown in Table 1 below.

Solvent: chloroform (eluent)

Flow rate: 1.0 ml/min

Column temperature: 40 °C

Standard: Polystyrene (corrected by cubic function)

TABLE 1

| | Molecular weight properties | | |
|---|---|---|---|
| Category | Mn | Mw | PDI |
| Example 1 | 24,073 | 38,963 | 1.61 |
| Example 2 | 66,306 | 264,804 | 3.99 |
| Example 3 | 55,769 | 171,131 | 3.06 |
| Example 4 | 66,667 | 168,322 | 2.52 |
| Comparative Example 1 | 40,310 | 112,000 | 2.7 |
| Comparative Example 2 | 60,189 | 164,201 | 2.7 |

2) Evaluation of DSC (Differential Scanning Calorimetry) Thermal Properties

Thermal characteristics (Tg, Tm, cold crystallization (2nd heating result), and Tc (1st cooling result)) of each step copolymer prepared in the Examples and Comparative Examples were measured in a nitrogen gas flow state using TA DSC250 model device, and the results are shown in Table 2 below.

Raise the temperature from 40 °C to 190 °C at 10 °C/min (1st heating)/Maintain the temperature at 190 °C for 10 minutes Cooling from 190 °C to 60 °C at 10 °C/min (1st cooling)/ Maintaining the temperature at −60 °C for 10 minutes Raise the temperature from −60 °C to 190 °C at 10 °C/min ($2^{nd}$ heating)

TABLE 2

| | Polymer thermal properties | | | | | | |
|---|---|---|---|---|---|---|---|
| | Tc | | Tg | Cold crystallization | | Tm | |
| Category | Temperature (°C) | Δ H (J/g) | Temperature (°C) | Temperature (°C)) | Δ H (J/g) | Temperature (°C) | Δ H (J/g) |
| Example 1 | 98.1 | 9.78 | 45 | 103.68 | 21.14 | 155.5 | 36.2 |
| Example 2 | 91.17 | 5.62 | 49.1 | 105.4 | 24.17 | 159.7 | 33.7 |
| Example 3 | 112.2 | 34.9 | 50.0 | N.D. | N.D. | 167.6 | 38.2 |
| Example 4 | 109.6 | 34.2 | 54.1 | N.D. | N.D. | 168.9 | 38.0 |
| Comparative Example 1 | 98.3 | 35.02 | 50.0 | N.D. | N.D. | 169.1 | 40.4 |
| Comparative Example 2 | 97.1 | 38.8 | 50.9 | N.D. | N.D. | 174 | 41 |

Generally, as the crystallization rate is higher, the enthalpy of Tc is larger, and the cold crystallization is absent or less. Further, as the crystallinity is higher, the Tm enthalpy is larger. In addition, it can be confirmed that if the degree of crystallinity is high, the strength of the material increases, but it is brittle and has no elasticity, whereas in the case of the branch structure as in the present disclosure, the brittle characteristics can be lowered by lowering the crystallinity.

More specifically, as seen in Tables 1 and 2 above, it is confirmed that as the content of the branches increases in the same molecular weight range, cold crystallization is observed, showing a trend of decreasing temperature and enthalpy values of Tc. Therefore, it can be confirmed that the enthalpy values of Tm are lowered.

The invention claimed is:

1. A branched poly(lactic acid-3-hydroxypropionic acid) copolymer of Chemical Formula 1:

[Chemical Formula 1]

$$R—[A—B]_k$$

wherein, in Chemical Formula 1:

R is a trivalent or higher functional group derived from a polyfunctional monomer;

A is a direct bond, or a linking group derived from an ether, sulfide, ester, thioester, ketone, sulfoxide, sulfone, sulfonate ester, amine, amide, imine, imide, or urethane;

B is a substituent of Chemical Formula 1-1 or Chemical Formula 1-2:

[Chemical Formula 1-1]

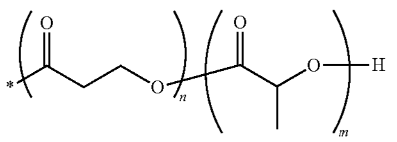

[Chemical Formula 1-2]

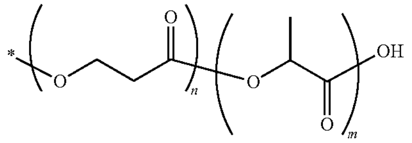

wherein:

* is a moiety connected to A;

k is an integer of 3 or more;

n is an integer of 1 to 700; and m is an integer of 10 to 5,000.

2. The branched poly(lactic acid-3-hydroxypropionic acid)copolymer according to claim 1, wherein:

R is a trivalent or higher linking group derived from a substituted or unsubstituted $C_{1-60}$ alkyl, a substituted or unsubstituted $C_{3-60}$ cycloalkyl, a substituted or unsubstituted $C_{6-60}$ aryl or a substituted or unsubstituted $C_{2-60}$ heteroaryl containing at least one of N, O and S, wherein at least one of the carbon atoms of the alkyl, cycloalkyl, aryl and heteroaryl is unsubstituted or substituted with at least one heteroatom selected from the group consisting of N, O and S, or carbonyl.

3. The branched poly(lactic acid-3-hydroxypropionic acid)copolymer according to claim 1, wherein:

the copolymer is obtained by subjecting 3-hydroxypropionic acid to a condensation polymerization with a polyfunctional monomer, or is obtained by subjecting β-propiolactone and a polyfunctional monomer to a ring-opening polymerization to prepare a branched poly(3-hydroxypropionic acid)polymer and then subjecting lactide and the resulting polymer to a ring-opening polymerization.

4. The branched poly(lactic acid-3-hydroxypropionic acid)copolymer according to claim 3, wherein:

the polyfunctional monomer is selected from the group consisting of glycerol, pentaerythritol, 3-arm-poly(ethyleneglycol)$_{n=2\sim15}$, 4-arm-poly(ethyleneglycol)$_{n=2\sim10}$, di(trimethylolpropane), tripentaerythritol, xylitol, sorbitol, inositol, cholic acid, β-cyclodextrin, tetrahydroxyperylene, 2,2'-bis(hydroxymethyl)butyric acid (BHB), pyridinetetraamine (PTA), diethyltriaminepentaacetic acid, melamine, propane-1,2,3-triamine, tetraacetylene pentaamine, benzene-1,3,5-triamine, toluene-2,4,6-triisocyanate, 2-isocyanatoethyl-2,6-diisocyanatocaproate, triphenyl ethane-4,4,4-triisocyanate, trimethylolpropane, triethanolamine, triglycidyl and s-triazine-1,3,5-triethanol ether.

5. The branched poly(lactic acid-3-hydroxypropionic acid)copolymer according to claim 1, wherein:

the copolymer has a weight average molecular weight (Mw) of 30,000 to 500,000.

6. A method for preparing a branched poly(lactic acid-3-hydroxypropionic acid)copolymer, the method comprising a first step of preparing a branched poly(3-hydroxypropionic acid)polymer, and a second step of subjecting the branched poly(3-hydroxypropionic acid)polymer and lactide to a ring-opening polymerization to prepare a branched poly(lactic acid-3-hydroxypropionic acid)copolymer of Chemical Formula 1:

[Chemical Formula 1]

$$R—[A—B]_k$$

wherein, in Chemical Formula 1;

R is a trivalent or higher functional group derived from a polyfunctional monomer;

A is a direct bond, or a linking group derived from an ether, sulfide, ester, thioester, ketone, sulfoxide, sulfone, sulfonate ester, amine, amide, imine, imide, or urethane; and B is a substituent of Chemical Formula 1-1 or Chemical Formula 1-2:

[Chemical Formula 1-1]

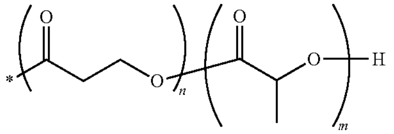

[Chemical Formula 1-2]

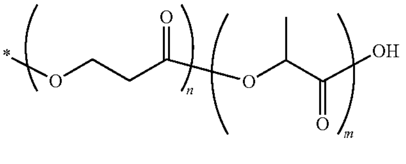

wherein:

k is an integer of 3 or more;

n is an integer of 1 to 700; and m is an integer of 10 to 5,000.

7. The method according to claim 6, wherein:

the branched poly(3-hydroxypropionic acid)polymer is the following Chemical Formula 2:

[Chemical Formula 2]

$$R—[A—(B')n]_k$$

wherein, in Chemical Formula 2:

R is a trivalent or higher functional group derived from a polyfunctional monomer;

A is a direct bond, or a linking group derived from an ether, sulfide, ester, thioester, ketone, sulfoxide, sulfone, sulfonate ester, amine, amide, imine, imide, or urethane; and B'is a substituent of Chemical Formula 1'-1 or Chemical Formula 1'-2:

[Chemical Formula 1'-1]

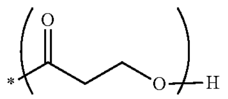

[Chemical Formula 1'-2]

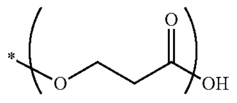

wherein:

* is a moiety connected to A:

k is an integer of 3 or more; and n is an integer of 1 to 700.

8. The method according to claim 6, wherein:

the branched poly(3-hydroxypropionic acid)polymer has a weight average molecular weight of 1,000 to 100,000.

9. The method according to claim 6, wherein:

in the first step, the branched poly(3-hydroxypropionic acid)polymer is prepared by subjecting 3-hydroxypropionic acid and a polyfunctional monomer to condensation polymerization, or is prepared by subjecting β-propiolactone and a polyfunctional monomer to a ring-opening polymerization.

10. The method according to claim 9, wherein:

the polyfunctional monomer is selected from the group consisting of glycerol, pentaerythritol, 3-arm-poly(ethyleneglycol)$_{n=2\sim15}$, 4-arm-poly(ethyleneglycol)$_{n=2\sim10}$, di(trimethylolpropane), tripentaerythritol, xylitol, sorbitol, inositol, cholic acid, β-cyclodextrin, tetrahydroxyperylene, 2,2'-bis(hydroxymethyl)butyric acid (BHB), pyridinetetraamine (PTA), diethyltriaminepentaacetic acid, melamine, propane-1,2,3-triamine, tetraacetylene pentaamine, benzene-1,3,5-triamine, toluene-2,4,6-triisocyanate, 2-isocyanatoethyl-2,6-diisocyanatocaproate, triphenyl ethane-4,4,4-triisocyanate, trimethylolpropane, triethanolamine, triglycidyl and s-triazine-1,3,5-triethanol ether.

11. The method according to claim 9, wherein:

in the first step, when the branched poly(3-hydroxypropionic acid)polymer is prepared by subjecting 3-hydroxypropionic acid and a polyfunctional monomer to a condensation polymerization, the polyfunctional monomer is included in an amount of 0.1 mol % to 20 mol % with respect to the content of 3-hydroxypropionic acid.

12. The method according to claim 9, wherein:

in the first step, when the branched poly(3-hydroxypropionic acid)polymer is prepared by subjecting β-propiolactone and a polyfunctional monomer to a ring-opening polymerization, the polyfunctional monomer is included in an amount of 0.1 mol % to 20 mol % with respect to the content of β-propiolactone.

13. The method according to claim 6, wherein:

in the second step, the branched poly(3-hydroxypropionic acid)polymer is included in an amount of 0.1 to 40 parts by weight with respect to the 100 parts by weight of the lactide.

14. The method according to claim 6, wherein:

the first step is performed in the presence of a sulfonic acid-based catalyst and a tin-based catalyst.

15. The method according to claim 6, wherein:

the first step performs a reaction at 80 °C to 100 °C and 8 mbar to 12 mbar for 110 minutes to 130 minutes, and then performs a reaction under vacuum conditions of $10^2$ torr for 4 to 26 hours.

16. The method according to claim 6, wherein:

in the second step, the polymerization is performed in the presence of a catalyst of Chemical Formula 3:

[Chemical Formula 3]

$$MA^1_pA^2_{2-p}$$

wherein, in Chemical Formula 3:

M is Al, Mg, Zn, Ca, Sn, Fe, Y, Sm, Lu, Ti or Zr;

p is an integer of 0 to 2; and $A^1$ and $A^2$ are each independently an alkoxy or a carboxyl group.

17. The method according to claim 6, wherein:

in the second step, the polymerization is performed in the presence of a tin(II) 2-ethylhexanoate ($Sn(Oct)_2$) catalyst.

18. The method according to claim 6, wherein:

in the second step, the polymerization is performed at 150 °C to 250 °C under nitrogen conditions for 60 minutes to 120 minutes.

* * * * *